United States Patent
Van Bommel et al.

(10) Patent No.: US 11,808,412 B2
(45) Date of Patent: Nov. 7, 2023

(54) COLOR CONTROLLABLE LED FILAMENT AND LAMP WITH SUCH A FILAMENT

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 9 days.

(21) Appl. No.: 17/630,343

(22) PCT Filed: Jul. 20, 2020

(86) PCT No.: PCT/EP2020/070404
§ 371 (c)(1),
(2) Date: Jan. 26, 2022

(87) PCT Pub. No.: WO2021/018646
PCT Pub. Date: Feb. 4, 2021

(65) Prior Publication Data
US 2022/0290820 A1     Sep. 15, 2022

(30) Foreign Application Priority Data

Jul. 30, 2019   (EP) .................................... 19189014

(51) Int. Cl.
*F21K 9/232*       (2016.01)
*F21Y 113/17*      (2016.01)
(Continued)

(52) U.S. Cl.
CPC ........... *F21K 9/232* (2016.08); *F21Y 2103/10* (2016.08); *F21Y 2113/17* (2016.08); *F21Y 2115/10* (2016.08)

(58) Field of Classification Search
CPC .. F21K 9/232; F21Y 2103/10; F21Y 2113/17; F21Y 2115/10
See application file for complete search history.

(56) References Cited

U.S. PATENT DOCUMENTS

| 9,967,943 B1 | 5/2018 | Wang et al. | |
| 2010/0277919 A1* | 11/2010 | Okada | H01L 33/54 257/E33.056 |

(Continued)

FOREIGN PATENT DOCUMENTS

| CN | 107202256 A | 9/2017 |
| JP | 2015038853 A * | 2/2015 |

(Continued)

OTHER PUBLICATIONS

English translation of Ishikawa JP-2015038853-A, published Feb. 2015 (Year: 2015).*

*Primary Examiner* — Evan P Dzierzynski

(57) ABSTRACT

A LED filament including a linear array of LEDs arranged on a carrier substrate, wherein the linear array is divided into two separate longitudinal sections, a first longitudinal section including only LEDs configured to emit white light, and a second longitudinal section including only LEDs configured to emit color controllable light. The present invention suggests confining the color LEDs to the second longitudinal section of the array, so that the first longitudinal section of the array is capable of emitting homogenous white light of a color temperature in the range of the LEDs in that section.

14 Claims, 2 Drawing Sheets

(51) Int. Cl.
    *F21Y 103/10*        (2016.01)
    *F21Y 115/10*        (2016.01)

(56)            References Cited

U.S. PATENT DOCUMENTS

| | | |
|---|---|---|
| 2012/0014111 A1* | 1/2012 | Welten .................... G02B 6/001 |
| | | 362/296.08 |
| 2015/0233536 A1* | 8/2015 | Krames ..................... F21K 9/64 |
| | | 362/84 |
| 2019/0017657 A1 | 1/2019 | Kim et al. |
| 2019/0086036 A1* | 3/2019 | Hofmann ................ F21K 9/232 |
| 2019/0128482 A1* | 5/2019 | Jiang .................... H05B 45/345 |
| 2019/0226644 A1 | 7/2019 | Van Bommel et al. |

FOREIGN PATENT DOCUMENTS

| | | | |
|---|---|---|---|
| JP | 2015038853 A | 2/2015 |
| WO | 2018157428 A1 | 9/2018 |
| WO | 2018221952 A1 | 12/2018 |

* cited by examiner

COLOR CONTROLLABLE LED FILAMENT AND LAMP WITH SUCH A FILAMENT

CROSS-REFERENCE TO PRIOR APPLICATIONS

This application is the U.S. National Phase application under 35 U.S.C. § 371 of International Application No. PCT/EP2020/070404, filed on Jul. 20, 2020, which claims the benefit of European Patent Application No. 19189014.4, filed on Jul. 30, 2019. These applications are hereby incorporated by reference herein.

FIELD OF THE INVENTION

The present invention relates to LED filaments, i.e. linear arrays of LEDs arranged on a carrier substrate, used e.g. in retrofit light bulbs. Specifically, the present invention relates to color controllable LED filaments.

BACKGROUND OF THE INVENTION

Incandescent lamps are rapidly being replaced by solid state light sources e.g. light emitting diodes (LED) based lighting solutions. It is nevertheless appreciated and desired by users to have retrofit lamps which have the look of an incandescent bulb. For this purpose, one can simply make use of the infrastructure for producing incandescent lamps based on glass and replace the conventional filament with a "LED filament", i.e. a linear array of LEDs arranged on a flexible carrier substrate. One or several such LED filaments may be arranged in a retrofit lamp, i.e. in a light bulb which has the appearance and interface of a conventional incandescent light bulb. Such a retrofit LED bulb will thus include a standard socket (e.g. E26), a transparent (e.g. glass) envelope, and one or several LED filaments arranged in the envelope. Such retrofit light bulbs have become increasingly popular for their practical and decorative lighting capacity.

Most commercially available LED retrofit lamps include LED filaments that provide white light with a single color temperature. Such LED filaments typically include one type of LEDs (e.g. blue or UV LEDs) covered by a luminescent coating (e.g. a phosphor layer). Recently, however, LED filaments have been proposed which are controllable between a warm white (WW) and a cool white (CW). Such temperature control may be accomplished with an array of alternating blue and red LEDs (R-B-R-B-R-B) covered by a luminescent coating (e.g. a phosphor layer). By varying the relative intensity of the red and blue LEDs, the resulting white light will have a different color temperature. Alternatively, as shown in WO 2018/157428, two arrays of identical LEDs may be provided with different types of phosphors. Again, the color temperature may be controlled by controlling the relative intensity of the LEDs in the two arrays.

It would be desirable to provide a LED filament which is also color controllable.

In U.S. Pat. No. 9,967,943B a lighting apparatus is disclosed that comprises the following elements. A first set of light emitting diode module includes a variety of light emitting diode elements, wherein different types of light emitting diode elements have different color temperature characteristics. A driving circuit supplies power to the first set of light emitting diode module, such that the plurality of light emitting diode elements emit light. Moreover, the driving circuit may supply currents with different total values, and the optical characteristics of the first set of light emitting diode module change accordingly, so as to change color temperatures.

In WO 2018/221952 an LED package is disclosed that includes a substrate, a first LED package disposed on the substrate and including at least one first LED chip, a second LED package disposed on the substrate and including at least one second LED chip, and a resistor disposed on the substrate, connected to the first LED package in series, and connected to the second LED package in parallel, in which the second LED package is connected in parallel to the first LED package and the resistor, and the first LED package and the second LED package are configured to emit light having different color temperatures.

SUMMARY OF THE INVENTION

It is an object of the present invention to provide a LED filament which is color controllable.

A LED filament is providing LED filament light and comprises a plurality of light emitting diodes (LEDs) arranged in a linear array. Preferably, the LED filament has a length L and a width W, wherein $L > 5W$. The LED filament may be arranged in a straight configuration or in a non-straight configuration such as for example a curved configuration, a 2D/3D spiral or a helix. Preferably, the LEDs are arranged on an elongated carrier like for instance a substrate, that may be rigid (made from e.g. a polymer, glass, quartz, metal or sapphire) or flexible (e.g. made of a polymer or metal e.g. a film or foil).

In case the carrier comprises a first major surface and an opposite second major surface, the LEDs are arranged on at least one of these surfaces. The carrier may be reflective or light transmissive, such as translucent and preferably transparent.

The LED filament may comprise an encapsulant at least partly covering at least part of the plurality of LEDs. The encapsulant may also at least partly cover at least one of the first major or second major surface. The encapsulant may be a polymer material which may be flexible such as for example a silicone. Further, the LEDs may be arranged for emitting LED light e.g. of different colors or spectrums. The encapsulant may comprise a luminescent material that is configured to at least partly convert LED light into converted light. The luminescent material may be a phosphor such as an inorganic phosphor and/or quantum dots or rods.

The LED filament may comprise multiple sub-filaments.

According to a first aspect of the invention, this and other objects are achieved by a LED filament including a linear array of LEDs arranged on a carrier substrate, wherein the linear array is divided into two separate longitudinal sections, a first longitudinal section including only LEDs configured to emit white light, and a second longitudinal section including only LEDs configured to emit color controllable light.

By "color controllable" is here intended that the wavelength of the emitted light may be controlled, and may include wavelengths in the color spectrum as well as white light. The color controllable light may be one single (homogeneous) color, or may be several separate (heterogeneous) colors.

It is noted that LED filaments with various combinations of white and colored LEDs are known in the art, e.g. from WO 2018/157428 mentioned above. However, a conventional approach of color controllable LED filaments typically involves an even distribution of white and colored LEDs, for example in W-R-G-B groups. When a LED filament based on such LED groups is used predominantly for warm white light, the green and blue LEDs will be low or completely OFF, potentially leading to an undesired spottiness.

Accordingly, the present invention suggests confining the color LEDs to the second longitudinal section of the array, so that the first longitudinal section of the array is capable of emitting homogenous white light of a (possibly controllable) color temperature in the range of the LEDs in that section. The LEDs in the second section may be controlled to emit colored light, or white light having a similar or different color temperature than the LEDs of the first section.

The length of the first longitudinal section (first length) is preferably greater than the length of the second longitudinal section (second length). For example, the first length is at least twice as long as the second length, or three times as long, or five times as long. This length distribution makes the LED filament suitable for emitting predominantly white light.

The second section may include at least three groups of red, green and blue (RGB) LEDs (i.e. each group comprises at least a red, a green and a blue LED). Preferably the second section includes at least four, at least five, at least six or at least seven RGB groups. Groups of RGB LEDs is a convenient way to provide color controllable light from LEDs. With this design, the LEDs in the second section may be controlled to emit only red light, only blue light, only green light, or any combination of those colors (i.e. wavelengths inside the RGB color space)—including white light.

The LEDs in each groups may be arranged with a smaller, intra-group distance between them, and with a greater, inter-group distance between groups. Alternatively, the LEDs are arranged at equidistance in an array, i.e. same distance between adjacent LEDs. In this case, the order of the LEDs may alternate, e.g. R-G-B-R-G-B-R-G-B or R-B-G-R-B-G-R-B-G.

In order to facilitate color control, the red, green and blue LEDs may be electrically serially connected in sets of equal color, i.e. a set of red LEDs, a set of green LEDs and a set of blue LEDs.

A "LED configured to emit white light" is here intended to include a LED that emits non-white light which is then wavelength converted by a wavelength converting layer including e.g. a luminescent material. It is the wavelength converted light that will form the LED filament light in the first section. Thus, the LEDs in the first section (i.e. white section) may be covered by an encapsulant including a luminescent material. The encapsulant covering the first section may be a single layer or a multi-layer encapsulant. For example, blue or UV LEDs may be used, and the light emitted from them be color converted by the luminescent material, e.g. phosphor. The emitted light will be a mix of the blue and/or UV light and the color converted light.

The LEDs in the first section may be controllable to emit white light with a color temperature in the range 1800-2500 K (often referred to as "warm" white light), preferable in the range 2000-2400 K, more preferably in the range 2100-2400 K, and most preferably in the range 2150-2350 K. To achieve a controllable color temperature, the LEDs in the first section may include LEDs of at least two colors, e.g. red and blue LEDs. By controlling the relative intensity of each type of LED, the color temperature of the emitted light can be controlled.

The LEDs in the second section may be covered by an encapsulant including a light scattering material, for example particles of $TiO_2$, $BaSO_4$ or $Al_2O_3$. Such scattering material will serve to homogenize the light emitted from the second section, i.e. better mix color contributions from differently colored LEDs. It is noted that the encapsulant covering the second section typically does not include any luminescent material. The encapsulant covering the second section may be a single layer or a multi-layer encapsulant.

The carrier substrate may be light transmissive, in order to allow emission of light in all directions. By "transmissive" is meant preferably translucent, most preferably transparent.

An appropriate length of the first longitudinal section may at least two centimeters, at least three centimeters, or at least five centimeters, depending on the implementation. This is a typical length of a conventional LED filament.

One or several LED filaments according to the first aspect of the invention may be included in a retrofit light bulb, further including a transmissive envelope at least partly surrounding the LED filaments, and a connector for electrically and mechanically connecting the light bulb to a socket.

Such a light bulb may further comprise a controller for controlling the LEDs in the first longitudinal section, and for controlling the LEDs in the second longitudinal section. The controller may be implemented as two separate sub-controllers, if this is appropriate.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
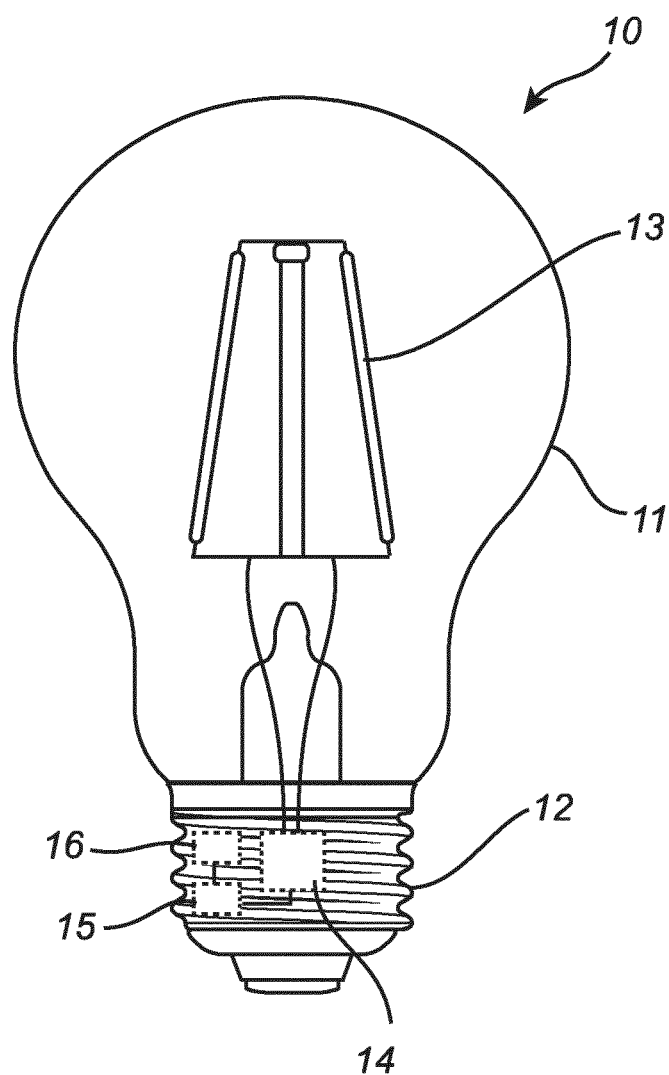
FIG. 1 schematically shows a retrofit light bulb according to an embodiment of the present invention.

FIG. 1 is a schematic side view of a color tunable filament lamp 10 according to an embodiment of the present invention. The color tunable filament lamp 10 may be referred to as a retrofit LED bulb. Similar to a conventional light bulb, the retrofit lamp 10 comprises a transmissive envelope 11, e.g. made of glass, and a connector 12, here a threaded Edison connector such E26 or E27. The connector 12 is configured to mechanically and electrically connect the lamp 10 to a conventional lamp socket (not shown).

The lamp 10 further comprises at least one LED filament 13, arranged inside the envelope 11 and electrically connected to a driver 14, which in turn is electrically connected to the connector 12. The driver 14 serves to convert AC power from a mains power supply to appropriate DC power for driving the LED filaments. In the illustrated example the lamp 10 includes two LED filaments 13, but any other number, such as three, four or more LED filaments may be included.

The lamp 10 may further comprise a controller 15, connected to the driver, and a wireless communication unit 16, configured to receive control signals to be applied to the controller, to ensure a desired operation of the lamp 10. It is noted that the driver 14, controller 15 and wireless unit 16 are only schematically illustrated in FIG. 1.

Figure 2:
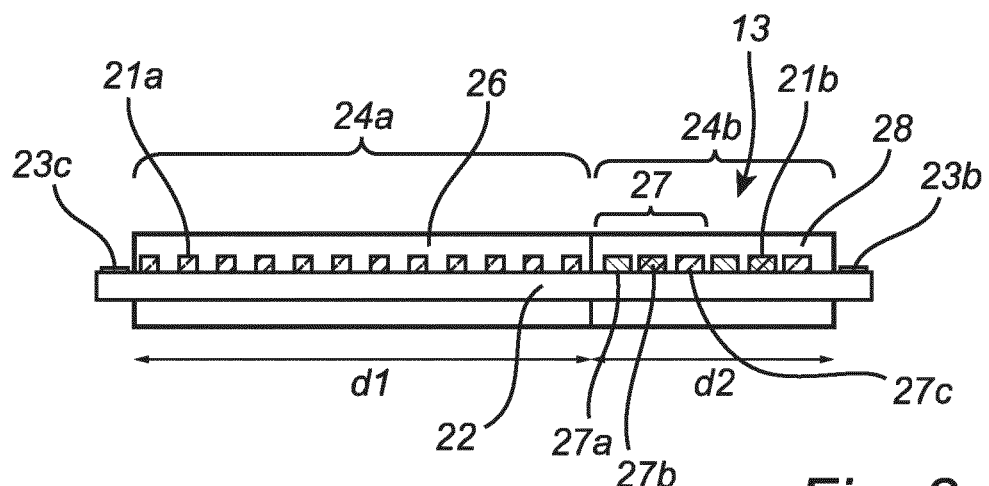
FIG. 2 shows a first embodiment of a LED filament in FIG. 1.
Figure 3:
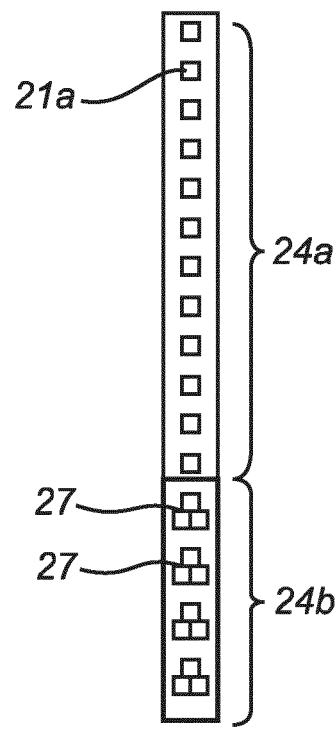
FIG. 3 shows a second embodiment of a LED filament in FIG. 1.

Examples of the LED filament 13 is shown in more detail in FIGS. 2 and 3. The LED filament here includes a plurality of LEDs 21 arranged in a linear array on a flexible substrate 22. The LEDs 21 are arranged in two separate longitudinal sections 24a, 24b, a first longitudinal section 24a including only LEDs 21a configured to emit white light, and a second longitudinal section 24b including only LEDs 21b configured to emit color controllable light. In the illustrated example, the length d1 of the first longitudinal section 24a is about twice as long as the length d2 of the second longitudinal section 24b. However, other length relationships may be preferred, such as d1>1.5×d2 or d1>1.8×d2. As an example, the length d1 of the first section 24a may be in the order of centimeter, e.g. around two centimeters.

The substrate mechanically supports and secures the LEDs 21, and also carries conducting paths (not shown) for electrical connection of the LEDs. The conducting paths, and thus the LEDs, are electrically connected to electrodes 23a, 23b, for electrical connection of the LED filament 12.

In the illustrated case, the filament 12 has connection electrodes 23a, 23b in each end. For example, the electrodes 23a in a first end may be connected to the LEDs 21a configured to emit white light, while the electrodes 23b in the other, opposite end may be connected to the LEDs 21b configured to emit color controllable light.

Alternatively, all electrodes are located in the same end of the filament 12. In other words, the electrodes connected to the LEDs 21a configured to emit white light and the electrodes connected to the LEDs 21b configured to emit color controllable light are all located in the same end of the filament 12.

Further, electrodes of the LEDs 21a configured to emit white light and/or the LEDs 21b configured to emit color controllable light may be arranged on the backside of the carrier/substrate 22.

It is noted that the LEDs 21b configured to emit color controllable light are controlled by using at least four electrodes. A first electrode connected to LEDs emitting a first color, a second electrode connected to LEDs emitting a second color, a third electrode connected to LEDs emitting a third color, and a fourth electrode connected to all LEDs 21b (i.e. shared electrode).

The LEDs 21a may be blue or UV LEDs covered by an encapsulant 26 including a luminescent material, such as phosphor particles. The luminescent material will provide a wavelength conversion of the light from the LEDs, and the light emitted from the section 24a will be white light consisting of a mix of blue/UV light and wavelength converted light. The white light may have a color temperature on the black body line. For example, the LEDs 21a may be configured to emit relatively warm white light, e.g. in the range of 1800-2500 K, preferably in the range 2200-2300 K. The light of the white LEDs preferably has a color rendering index of at least 80, more preferably at least 85, most preferably at least 90.

In one embodiment, the color temperature of the white light may be preset and static. In another embodiment, the white light has an adjustable color temperature. This may be achieved by including at least two different types of LEDs 21a in the section 24a, e.g. red and blue LEDs. By controlling the relative intensity of each type of LED, the color temperature of the emitted light can be controlled. Another approach may be to have only one type of LEDs (e.g. blue LEDs) but to have different areas covered by different types of encapsulant. Again, by controlling the relative intensity of LEDs associated with different encapsulants, the color temperature of the emitted light can be controlled.

The color controllable LEDs 21b here include a plurality of LED groups 27 each including a red LED 27a, a green LED 27b and a blue LED 27c. As in FIG. 2, the red, green, and blue LEDs 27a-c in each group 27 can be disposed one after the other in the longitudinal direction of the RGB LED filament 13.

In a further embodiment, the first section 24a and the second section 24b may be arranged at a short relative distance, for instance similar to the distance between two adjacent LEDs in one section. This allows an encapsulant 26, 28 covering the LEDs of both sections 24a and 24b. The LEDs on the first section 24a may be separated from the LEDs on the second section 24b by a larger distance, for instance 3 or 5 mm, allowing to apply separate encapsulants 26 and 28 over the sections 24a and 24b respectively. There may be a bend in between the first section 24a and the second section 24b. Alternatively, as shown in FIG. 3, the "intra-group" distance between the red, green, and blue (micro) LEDs 27a-c in a group 27 may be smaller than the "inter-group" distance between groups. For example the intra-group distance may be ≤1 mm while the inter-group distance could be several millimeters. The red, green, and blue LEDs 27a-c may be micro LEDs, e.g. with a chip size in the range of 100-200 μm, and placed together in an integrated unit 27. The groups 27 of LEDs may be arranged in a linear array, similar to the arrangement of the white LEDs 21a in the first section 24a. Within each group 27, the LEDs 27a-c may be arranged non-linearly, e.g. in a triangle fashion as indicated in FIG. 3.

The LEDs 21b in the second section 24b may be covered by an encapsulant 28 optionally including a light scattering material.

As illustrated in FIG. 2, the substrate 22 may be transparent, and the encapsulant layers 26 and 28 may then be disposed on both sides of the substrate. Alternatively, there may be LEDs arranged on both sides of the substrate.

The red LEDs 27a provide a red channel, the green LEDs 27b provide a green channel, and the blue LEDs 27c provide a blue channel, and wherein the red, green and blue channels are individually addressable by the controller 15, such that the channels can be individually varied in output (flux).

The two sets of LEDs, i.e. the set of white LEDs 21a and the set of color controllable LEDs 21b, are individually controllable by the controller 15, to allow separate control of the two sections 24a, 24b.

Specifically, the controller 15 is configured to control the LEDs 21b such that the color of light emitted from the second section 24b corresponds to a first setpoint selected by a (human) user or a machine. The first setpoint may be communicated to the wireless unit 16, and applied to the controller 15 as a control signal. The controller 15 controls the driver 14 to apply appropriate current or voltage control of the LEDs 21b.

Further, the controller 15 is optionally configured to control the LEDs 21a such that the color temperature of the white light emitted by the first section 24a corresponds to a second setpoint selected by a (human) user or a machine. Also, the second setpoint may be communicated to the wireless unit 16, and applied to the controller 15 as a control signal. The controller 15 controls the driver 14 to apply appropriate current or voltage control of the LEDs 21a.

It is noted that the controller 15 may be implemented as two separate sub-controllers, one for the first section 24a and one for the second section 24b.

Figure 4A:
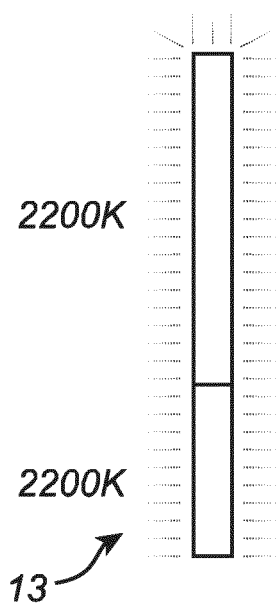
FIGS. 4a-c shows three examples of control of the LED filament according to embodiments of the invention.
Figure 4B:
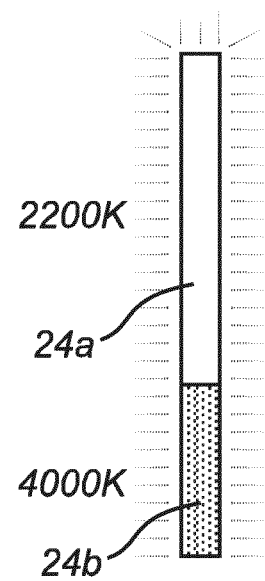
Figure 4C:
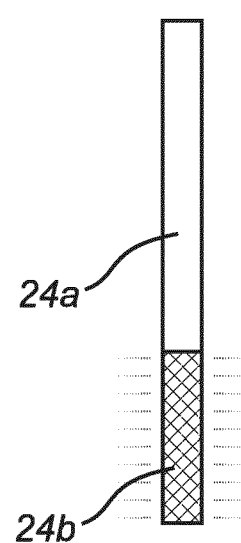

FIGS. 4a-c provide some examples of possible control schemes which may be realized by the filament 13. In FIG. 4a, the colored section 24b is controlled to emit white light of the same color temperature as the white section 24a, to provide an essentially homogenous white light output. In FIG. 4b, the colored section 24b is controlled to emit white light of a different color temperature than the white section 24a. For example, the white section 24a may be configured to (i.e. preset or controlled to) emit warm white light (e.g. 2200 K), while the color section 24b is controlled to emit cold white light (e.g. 4000 K). In FIG. 4c, the white section 24a is turned off, while the colored section emits colored light of a desired color. The result is a light output with a desired color or white light with a tint.

The person skilled in the art realizes that the present invention by no means is limited to the preferred embodiments described above. On the contrary, many modifications and variations are possible within the scope of the appended claims. For example, there are many different ways to arrange LED filaments in a lamp, both mechanically and electrically. Such details are not considered to be an important part of the present invention, which relates to the design of the LED filament.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A LED filament including a linear array of LEDs arranged on a carrier substrate, wherein:
    the linear array is divided into two separate longitudinal sections, a first longitudinal section including only LEDs configured to emit white light with a color temperature, and a second longitudinal section including only color controllable LEDs configured to emit color controllable light, said color controllable LEDs comprise LED groups each including a red LED, a green LED and a blue LED, within each group the LEDs are arranged non-linearly, e.g. in a triangle fashion, and
    wherein LEDs in each groups are separated by a first, intra-group distance, and wherein groups are separated by a second, inter-group distance, wherein said inter-group distance is greater than said intra-group distance; and
    wherein the two longitudinal sections are separated by a distance to enable a bend between the two longitudinal sections and allow for two separate encapsulants over respective longitudinal sections.

2. The LED filament according to claim 1, wherein the first longitudinal section has a first length, the second longitudinal section has a second length, and wherein the first length is greater than the second length, preferably the first length is at least twice as long as the second length.

3. The LED filament according to claim 1, wherein the LEDs are arranged at equidistance in an array.

4. The LED filament according to claim 1, wherein the LEDs in the first section are covered by an encapsulant including a luminescent material.

5. The LED filament according to claim 4, wherein the LEDs in the first section are controllable to emit white light with a color temperature in the range 1800-2500 K.

6. The LED filament according to claim 1, wherein the LEDs in the second section are covered by an encapsulant including a light scattering material.

7. The LED filament according to claim 1, wherein the carrier substrate is light transmissive.

8. A retrofit light bulb, comprising at least one LED filament according to claim 1, a transmissive envelope at least partly surrounding said LED filaments, and a connector for electrically and mechanically connecting said light bulb to a socket.

9. The retrofit light bulb according to claim 8, further comprising a controller for controlling the LEDs in the first longitudinal section, and for controlling the LEDs in the second longitudinal section.

10. A method for controlling a LED filament according to claim 1, comprising controlling a color temperature of light emitted by the LEDs in the first section, and independently controlling a color and/or color temperature of light emitted by the LEDs in the second section.

11. The method according to claim 10, wherein the LEDs in the second section are controlled to emit white light.

12. The method according to claim 11, wherein the LEDs in the second section are controlled to emit white light having a same color temperature as light emitted by the LEDs in the first section.

13. The method according to claim 12, wherein the LEDs in the first section are controlled to emit white light with a relatively warm color temperature, and the LEDs in the second section are controlled to emit white light with a relatively cool color temperature.

14. The LED filament according to claim 1, wherein the first longitudinal section comprises at least two different types of LEDs configured to emit color temperature controllable light.

* * * * *